US006334183B1

(12) United States Patent
Blomgren et al.

(10) Patent No.: US 6,334,183 B1
(45) Date of Patent: Dec. 25, 2001

(54) METHOD AND APPARATUS FOR HANDLING PARTIAL REGISTER ACCESSES

(75) Inventors: James S. Blomgren; Anthony M. Petro, both of Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/195,757

(22) Filed: Nov. 18, 1998

Related U.S. Application Data (60) Provisional application No. 60/065,643, filed on Nov. 18, 1997.

(51) Int. Cl.[7] .................................................. G06F 15/00
(52) U.S. Cl. ............................ 712/221; 712/223; 708/236
(58) Field of Search ............................ 712/221, 222, 712/223, 224; 708/236, 495, 525, 523, 490

(56) References Cited

U.S. PATENT DOCUMENTS

| 5,144,576 | * | 9/1992 | Briggs et al. ........................ 708/493 |
| 5,204,828 | * | 4/1993 | Kohn .................................... 708/501 |
| 5,524,263 | | 6/1996 | Griffith et al. . | |
| 5,835,394 | * | 11/1998 | Wong .................................... 708/670 |
| 5,880,983 | * | 3/1999 | Elliott et al. ......................... 708/501 |
| 5,930,159 | * | 7/1999 | Wong .................................... 708/550 |
| 5,935,198 | * | 8/1999 | Blomgren ............................. 708/290 |

* cited by examiner

Primary Examiner—Eddie Chan
Assistant Examiner—Gautam R. Patel
(74) Attorney, Agent, or Firm—Booth & Wright, L.L.P.; Matthew J. Booth (57) ABSTRACT

The present invention includes a partial register write handler. The write handler receives either two or three operands. An execution unit operates on portions of two operands, rather than on full operands. The result of the execution unit has fewer bits than an "additional" operand, which may be any of the two or three operands received by the write handler. An output multiplexer receives all of the bits of an execution unit result and selected bits of the additional operand, and produces an output that has as many bits as the additional operand. If the output of the multiplexer is a string of bits, the string of bits contains the execution unit result as a substring of bits. The remaining bits of the output of the multiplexer are selected from the additional operand.

36 Claims, 2 Drawing Sheets

METHOD AND APPARATUS FOR HANDLING PARTIAL REGISTER ACCESSES

This application claims the benefit of the earlier filed U.S. Provisional Application Ser. No. 60/065,643, filed Nov. 18, 1997, which is incorporated by reference for all purposes into this application.

BACKGROUND OF THE INVENTION

1. Field of the Invention

The present invention relates to the field of computer operation, and more specifically to register files in a computer.

2. Description of the Related Art

The original 8086 used eight general purpose registers in a sequential processor. Each instruction was received and was processed one at a time. However, as processors have become pipelined to achieve higher clock rates, dealing with instructions has become more problematic. Pipelined instructions have added complexity in dealing with bypassed operands, and have made handling partial registers more difficult. Pipelined processors have been able to process instructions out of order, "shelving" instructions until all operands needed for the operation are valid.

When an instruction that requires operands is received, the pipelined processor has typically responded by examining the register file to determine whether all of the operands are available. If some operands are not available, the instruction is "shelved" until the operands become available. An instruction may remain shelved for several clock cycles. For example, this could occur when operands missing from an instruction must be read from a memory having a high latency. While an instruction is shelved, however, later instructions received by the processor may attempt to update the values of the operands that were available in the shelved instruction. Consequently, performing operations out of order can be a complicated task, as updates to operand values require complicated register file management.

Similarly, instructions have been allowed to produce intermediate values, which have not been ready to be written to the register file. "Intermediate" values refer to those values generated by an execution unit such an arithmetic logic unit (ALU), but which may not be complete. When an instruction that has generated a result is not yet known to be on the execution path, the instruction is not yet known to be complete. For example, consider an instruction to add the values of AX and BX and place the result in AX. The value of BX may be available, but the original value of AX may not be available. In such a case, the instruction is not complete; an operand is still necessary to complete the operation. The result, therefore, is "intermediate" in that it depends on a yet-to-be-determined value. Such intermediate values may not be written to the register file until the instruction is known to be complete.

Instructions are not known to be complete until all older instructions in the instruction path have completed and have not encountered any exceptional conditions. However, pipelined processors have generally been permitted to execute instructions on intermediate data, and then later to determine that the intermediate data is valid and may be written to the register file. Pipelined processors have therefore achieved much of their speed performance by allowing results to be used before those results are committed to the register file.

When a processor has received updates for some, but not all, of the operands needed for a particular operation, the pipelined processor has required additional logic to prevent use of "old" values for the missing operands. Handling instructions out of order can greatly complicate this task. Moreover, when partial register handling has been supported, updates to a portion of a register have complicated handling the register, where portions of the register have been valid and portions of the register have been invalid.

Intermediate results have therefore been held in a pending state until written to the register file. The pending state has been implemented as an additional "pending" file somewhat structurally similar to, and in some implementations larger than, the register file. Bypassing, or reading intermediate values from the pending state, has allowed pipelined processors to execute instructions before determining that the instructions that had generated those intermediate values are complete.

Typically, the pending state has been implemented as a number of stages along a pipeline. Data has been copied from one stage to the next until, at the final stage, that data has been written to the register file. At each point along the pipeline, data has been available to "younger" instructions, with more recent updates to the register value being written to the first stage of the pipeline. Instructions have been able to select values from the various stages of the pipeline, and from the register file.

To handle the relatively large number of sources (the various stages of the pipeline and the register file) from which an instruction can read values of an operand, a bypass multiplexer ("bypass multiplexer") has typically been included. The implementation of the bypass multiplexer, however, is different in many CISC architectures than it is in RISC architectures, because the former supports partial register write operations, while the latter does not.

The x86 instruction set originally supported eight 16-bit general purpose registers, four of which could be divided into two 8-bit general purpose registers. Division of registers AX, BX, CX, and DX allowed byte-access (8-bit access) to the upper and lower bytes of these registers. As a result, not only have registers AX, BX, CX, and DX been supported, but also registers AH, AL, BH, BL, CH, CL, DH, and DL, referring to the high-order byte and low-order byte within each 16-bit register. The register count effectively increased to 16 registers: registers AX, BX, CX, DX, AH, AL, BH, BL, CH, CL, DH, DL, SP, BP, SI, and DI. Registers SP, BP, SI, and DI have not been divided.

Moreover, with the introduction of the 386, the x86 architecture grew to support 32-bit registers. However, the prevalence of code using the original 16-bit register set instruction set necessitated support of both 16-bit and 32-bit register sizes. The 386 instruction set allowed access to all the aforementioned registers, as well as allowing access to "extended" (32-bit) registers. The 16-bit registers were considered partial registers of the new 32-bit registers. Each instruction was provided with four partial register options: the instruction could select the full "extended" register, or the "lower" 16-bits of the extended register, or the high-order byte or the low-order byte of the lower 16-bit register.

For example, in the 386 instruction set, an instruction was permitted to access an extended register, for example EAX. Such an access would access bits [31:0] of a 32-bit register. Another instruction could access a 16-bit register, for example AX. Such an access would access bits [15:0] of the same 32-bit register. Another instruction could access an 8-bit register, for example, AL. Such an access would access bits [7:0] of the same 32-bit register. Another instruction could access another 8-bit register, for example, AX. Such an access would access bits [15:8] of the same 32-bit register.

In part due to the problem of handling partial registers in a pipelined processor, and in part due to the low cost of registers, RISC microprocessors have not supported partial register write operations. Adding registers has become far less expensive than dividing existing registers, particularly in light of the added complexity. Therefore, the RISC processor historically has operated on registers in their entirety. Consequently, the bypass multiplexer in a pipelined RISC processor configuration has been required only to select one of the sources (the various stages of the pipeline or the register file) from which an instruction can read values of an operand.

On the other hand, CISC architectures allow a variety of portions of the registers to be altered. A pipelined CISC processor configuration that allows portions of registers to be operated upon has typically required an additional field to indicate which portion of the register has been updated between one stage and the next. The same result stage registers have been used for the result, and the additional field has been used to indicate how to write (commit) the result to the register file at the end of the pipeline. Since CISC architecture allows a variety of portions of registers to be altered, the bypass multiplexer must select more than one place that an operand might be found, since portions of that operand may be generated by different instructions.

These approaches have proven unsatisfactory. The implementation of the bypass multiplexer has proven extremely complicated in CISC architectures. A particularly problematic example is the situation in which multiple instructions have written to different portions of a register, and then an instruction requiring the value of the register is encountered. In such a case, various stages of the pipeline contain different portions of the register value to be used. According to one approach, the instruction requiring the value of the register has caused the bypass multiplexer to select from the relatively large number of sources of values. According to another approach, the instruction requiring the value of the register has been stalled until enough of the results have been written that the operand comes from a single result register or from the register file itself. According to still another approach, a combination of complex multiplexing and stalling has been used.

SUMMARY OF THE INVENTION

The present invention includes a partial register write handler. The write handler receives either two or three operands. An execution unit operates on portions of two operands, rather than on full operands. The result of the execution unit has fewer bits than an "additional" operand, which may be any of the two or three operands received by the write handler. An output multiplexer receives all of the bits of an execution unit result and selected bits of the additional operand, and produces an output that has as many bits as the additional operand. If the output of the multiplexer is a string of bits, the string of bits can contain the execution unit result as a substring of bits, and the remaining bits of the output of the multiplexer are selected from the additional operand.

The present invention includes, according to an exemplary embodiment, an apparatus that comprises a first input for receiving a first operand, a second input, and a third input. The first input is configured to receive a first operand having a first plurality of bits. The second input is configured to receive a second operand having a second plurality of bits. The third input is configured to receive a third operand having a third plurality of bits.

The exemplary embodiment of the present invention also includes an execution unit. The execution unit is configured to perform an operation upon a portion of the first operand and upon a portion of the second operand. The execution unit is also configured to provide a result having a number of bits no greater than the number of bits of the third operand.

The exemplary embodiment of the present invention also includes a multiplexer, configured to receive all of the bits of the execution unit result and all of the bits of the third operand. The multiplexer is also configured to select a portion of the third operand, and to provide a multiplexer output. The multiplexer output comprises the selected portion of the third operand and the execution unit result. Once the multiplexer output is produced, it replaces the third operand.

In some embodiments, the first operand and the third operand are the same operand. The execution unit is also configured to provide a result having a number of bits no greater than the number of bits of the third operand. The multiplexer output comprises the selected portion of the first operand and the execution unit result. Once the multiplexer output is produced, it replaces the first operand.

In some embodiments, the first and second operands (and, when a third operand is included, the third operand) all have equal numbers of bits. Moreover, the bits of each of the operands are numbered, and there is a one-to-one correspondence between the bits of the various operands. However, in some embodiments, the selected portion of the first operand and the selected portion of the second operand contain bits that correspond to one another; for example, the selected portion of the first operand may include bits 0 to 7 of the first operand, and the selected portion of the second operand may include bits 0 to 7 of the second operand. In other embodiments, no bit in the selected portion of the first operand corresponds to any bit in the selected portion of the second operand; for example, the selected portion of the first operand may include bits 0 and 7 of the first operand, and the selected portion of the second operand may include bits 8 to 15 of the second operand.

Although there is a one-to-one correspondence between the bits of the third operand and the bits of the first and second operands, the selected portion of the third operand includes all of the bits of the third operand except those that correspond to a bit in either of the first and second operands. For example, when the selected portion of the first operand includes bits 0 to 7 of the first operand, and the selected portion of the second operand includes bits 0 to 7 of the second operand, the selected portion of the third operand includes bits 8 to 31 of the third operand. When the selected portion of the first operand includes the bits 0 to 7 of the first operand, and the selected portion of the second operand includes bits 8 to 15 of the second operand, then the bits selected from the third operand are the bits which are not provided from the execution unit.

In some embodiments, when the execution unit is configured to perform an operation, the operation performed is an ADD operation performed by the arithmetic logic unit within the execution unit. The ADD operation produces a sum of the selected portion of the first operand and the selected portion of the second operand. In some such embodiments, the multiplexer is configured to provide bits 0 to 7 of the third operand as bits 0 to 7 of the multiplexer output, the sum as bits 8 to 15 of the multiplexer output, and bits 16 to 31 of the third operand as bits 16 to 31 of the multiplexer output. In other such embodiments, the multiplexer is configured to provide the sum as bits 0 to 7 of the multiplexer output, and bits 8 to 31 of the third operand as bits 8 to 31 of the multiplexer output.

In still other embodiments of the present invention, a system includes a register file containing a first plurality of registers. The first plurality of registers includes a first register having a first number of bits, and a second register having a second number of bits, and a third register having a third number of bits. The system also includes a pending file containing a second plurality of registers. The second plurality of registers includes at least one register corresponding to the first register, at least one register corresponding to the second register, and at least one register corresponding to the third register.

In such embodiments, the system also includes a bypass multiplexer configured to select a first operand either from the first register or from one of the at least one register corresponding to the first register in the pending file. The bypass multiplexer configured to select a second operand either from the second register or from one of the at least one register corresponding to the second register in the pending file. The system also includes an execution unit, configured to perform an operation upon a portion of the first operand and upon a portion of the second operand. The execution unit is further configured to provide a result having a number of bits no greater than the number of bits of the third register.

In such embodiments, the system also includes an output multiplexer that receives all of the bits of the execution unit result, and selects a third operand either from the third register or from one of the at least one register corresponding to the third register in the pending file. However, in some of these embodiments, the third register is actually the first register. The output multiplexer also selects a portion of the third operand having a number of bits equal to the difference between the number of bits in the third register and the number of bits in the execution unit result. Accordingly, the multiplexer provides a multiplexer output comprising the selected portion of the third operand and the execution unit result, and provides the multiplexer output to either the third register or to one of the registers corresponding to the third register in the pending file.

DETAILED DESCRIPTION OF THE INVENTION

The present invention comprises partial register access handler. This disclosure describes numerous specific details that include specific structures, circuits, and logic functions in order to provide a thorough understanding of the present invention. One skilled in the art will appreciate that one may practice the present invention without these specific details.

According to one embodiment of the present invention, a partial write handler allows the bypass multiplexer to combine a variety of portions of the registers, despite the large number of locations in which various pipelined stages of the register may be located. Tables 1–5 illustrate how one embodiment of the present invention handles a read instruction that attempts to read at least some of the bits of a register, but which follows a previous instruction that has written to at least some of the bits of a register.

Table 1 describes a write-then-read situation. The "B" in Table 1 indicates that the value can be bypassed. In Table 1, a register value is written to a register by an execution unit performing an instruction, and then immediately read from the first pipeline stage by the immediately following instruction. In other words, the most recently generated instance of the register value is read. As shown in Table 1, in such a situation, the register file can be bypassed. Bypassing the register file indicates that the instruction that generated the value is complete, and that other instructions may use the value.

TABLE 1

|  |  | Partial register written-to by the first instruction | | | |
| --- | --- | --- | --- | --- | --- |
|  |  | EAX | AX | AH | AL |
| Partial register read by the second instruction | EAX | B | ? | ? | ? |
|  | AX | ? | B | ? | ? |
|  | AH | ? | ? | B | ? |
|  | AL | ? | ? | ? | B |

Bypassed values are still written to the register file, as intermediate values before they are written to the register file.

Table 2 describes a different write-then-read situation. In Table 2, a portion of the register value is generated by a first instruction, and then a portion of that portion is needed by a second instruction. In such a case, the number of bits being written and the number of bits thereafter being read are unequal, but the bits being read by the second instruction are assuredly the updated value. In other words, Table 2 illustrates a situation in which the read instruction "wants" a smaller portion of the data that was produced by the write. For example, if an instruction that reads AX follows an instruction that writes all of EAX, then the read instruction receives only updated bits.

Table 2 encompasses the Table 1 case, i.e., where the same register is written and then read. Table 2 also adds the situation in which a portion of the register value is generated by a first instruction, and then a portion of that portion is needed by a second instruction. Write operations to EAX or AX cannot be followed by a read operation from AH, due to bit alignment uncertainties.

TABLE 2

|  |  | Partial register written-to by the first instruction | | | |
| --- | --- | --- | --- | --- | --- |
|  |  | EAX | AX | AH | AL |
| Partial register read by the second instruction | EAX | B | ? | ? | ? |
|  | AX | B | B | ? | ? |
|  | AH | ? | ? | B | ? |
|  | AL | B | B | ? | B |

Table 3 shows the write-then-read situation where either the write operation writes data to register AH, or the read operation reads from AH, or both. When AH is written, data is provided to bits [15:8] of register EAX. However, the remaining bits, bits [7:0] and bits [31:16], are not up Consequently, reading from EAX or AX would require obtaining bits [15:8] from the updated value provided by the write command, and also obtaining other bits from another location. While this could be done by a complex multiplexer, generally, this is performed by stalling until all the necessary bits have been updated. Stalling, or interlocking, is indicated by an "I" in Table 3.

TABLE 3

|  |  | Partial register written-to by the first instruction | | | |
|---|---|---|---|---|---|
|  |  | EAX | AX | AH | AL |
| Partial register read by the second instruction | EAX | B | ? | I | ? |
|  | AX | B | B | I | ? |
|  | AH | I | I | B | ? |
|  | AL | B | B | ? | B |

Referring now to Table 4, when an entire different portion of a register is written than is being requested, then the operand is obtained from the register file rather than from the updated bits. This is indicated by the letter "R" in Table 4. The updating of the bits that are not requested is irrelevant to the read instruction.

TABLE 4

|  |  | Partial register written-to by the first instruction | | | |
|---|---|---|---|---|---|
|  |  | EAX | AX | AH | AL |
| Partial register read by the second instruction | EAX | B | ? | I | ? |
|  | AX | B | B | I | ? |
|  | AH | I | I | B | R |
|  | AL | B | B | R | B |

Referring now to Table 5, when more of the register is read than had been written, the bypass multiplexer must combine bits from different sources, or stall. Writing to AX and then reading EAX requires the read instruction to obtain bits [15:0] from the updated AX, and the remaining bits [31:16] from a pipeline stage representing a previous write instance of the register value. Similarly, writing to AL and then reading from AX or EAX requires the read instruction to obtain bits [7:0] from the updated AL, and the remaining bits [15:8] (in the case of reading AX) or [31:8] (in the case of reading EAX) from a pipeline stage representing a previous write instance of the register value. While this could be done by a complex bypass multiplexer, generally pipeline processors merely stall on such instructions until all the necessary bits have been updated. Stalling, or interlocking, is indicated by an "I" in Table 5.

TABLE 5

|  |  | Partial register written-to by the first instruction | | | |
|---|---|---|---|---|---|
|  |  | EAX | AX | AH | AL |
| Partial register read by the second instruction | EAX | B | I | I | I |
|  | AX | B | B | I | I |
|  | AH | I | I | B | R |
|  | AL | B | B | R | B |

When complex bypass multiplexers are used in a pipeline processor, the additional internal interconnect requirements of the control hardware increase by a factor of three, since there are three portions of a register which can be independently written.

Mapping Register File Bits to an Output Multiplexer

Figure 1:
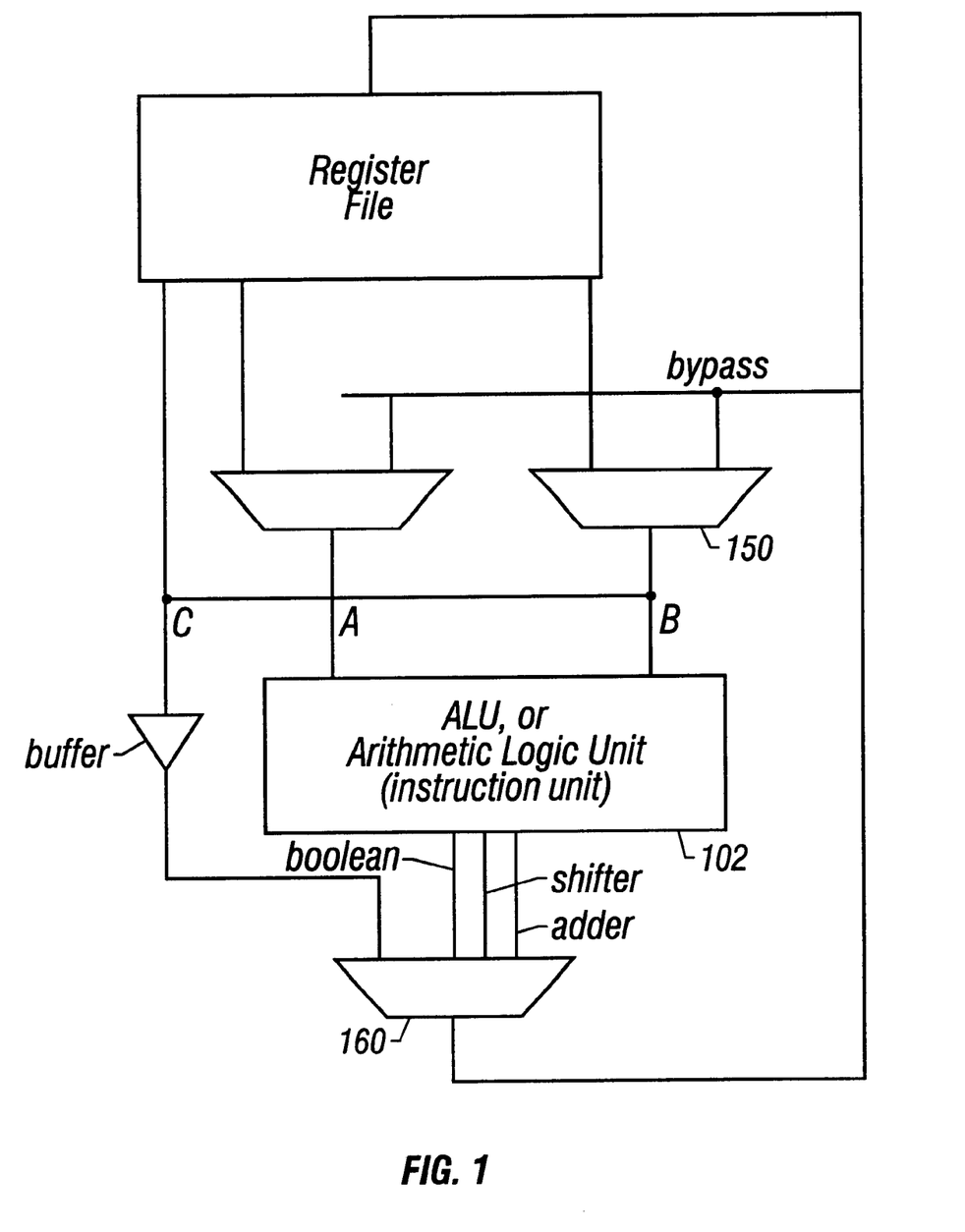
FIG. 1 shows a partial write handler having both a bypass multiplexer and an output multiplexer, according to one embodiment of the present invention.

FIG. 1 shows one embodiment of the present invention comprising a partial write handler having both a bypass multiplexer 150 and an output multiplexer 160. The bypass multiplexer 150 provides an input to an execution unit 102 such as an arithmetic logic unit (ALU). The execution unit 102 receives and executes an instruction. The instruction is selected from an instruction set that allows access to partial registers AH, AL, BH, BL, CH, CL, DH, and DL, referring to the high-order byte and low-order byte within each 16-bit register, as well as to the full 16-bit registers AX, BX, CX, and DX, and their 32-bit extended versions. The output of the execution unit 102 contains a number of bits that depends on the instruction being performed.

According to the embodiment of the present invention shown in FIG. 1, the partial register write handler also includes output multiplexer 160. Output multiplexer 160 receives the output of the execution unit 102 as well as additional bits, and then provides a full 32-bit output upon every clock cycle. The use of the output multiplexer 160 to produce a 32-bit output obviates the need for the bypass multiplexer 150 to select bits from multiple locations in the cases shown above in Tables 3–5.

The output multiplexer produces results that appear as if the entire 32-bit registers were updated upon each clock cycle. In effect, a substitute instruction set is created, in which instructions that write to partial registers are replaced with instructions that not only write to partial registers, but also read enough bits from the register file to generate a full 32-bit register value. A, B, and C in FIG. 1 represent operands residing in partial registers that are provided to ALU 102 and/or the output multiplexer 160. If, for example, the bottom (least significant) bits of register EAX are incremented (AL) then the upper 24 bits are set to the value that would be in the register file entry for EAX after the increment completes. Since the increment does not modify the upper 24 bits, the value after the increment is the same as the value before the increment.

According to a first embodiment of the present invention, the output multiplexer and the execution unit 102 perform their respective operations in parallel. To accomplish this, the output multiplexer 160 determines the destination register of the instruction being executed in the execution unit 102 before the execution unit 102 begins executing the instruction. The output multiplexer 160 also determines the number of bits the instruction being executed in the execution unit 102 can generate, also before the execution unit 102 begins executing the instruction. The output multiplexer 160 then accesses the register file, and reads the prior value of the destination register. The output multiplexer 160 then merges the bits of the destination register's prior value with the destination register's update to provide a 32-bit register value.

Assuming the Destination Register is One of the Source Registers

Since the number of instructions within the x86 instruction set is quite extensive, providing an output multiplexer 160 that maps bits of all of the registers in the register file would be an enormous task. However, most instructions in the x86 instruction set select and operate on two (source) operands, and then write the result back to one of the two source operands rather than to a third operand. The output multiplexer 160 of the present invention takes advantage of this feature of the x86 instruction set. For example, all of the x86 instruction set ADD operations fall into six categories, all of which overwrite at least part of one of the source registers. In other words, for any two registers, identified in a particular order, there are six ADD operations in the x86 instruction set, all of which overwrite at least part of the one of the two source registers. The six ADD operations of the x86 instruction set that use registers EAX and EBX as source registers are:

ADD BH, AL→AL;

ADD BL, AL→AL;

ADD BH, AH→AH;

ADD BL, AH→AH;

ADD BX, AX→AX;

ADD EBX, EAX→EAX.

In all six cases, the destination register is one of the source registers. For such instructions, the output multiplexer 160 is able to identify the two source operands before the execution unit 102 can even begin executing the instruction. In embodiments using only two operands, the third operand C is replaced with the second operand B.

Special Purpose Execution Unit

According to a second embodiment of the present invention, the execution unit 102 is replaced with a large number of special-purpose execution units 102. For example, if the execution unit 102 of the first embodiment is an arithmetic logic unit (ALU), then in the second embodiment the ALU is replaced with a large number of special purpose execution units 102. One such special purpose execution unit 102 is a merge adder. While the second embodiment is described in reference only to add, the same applies to other operations, including shifts and boolean operations.

Figure 2:
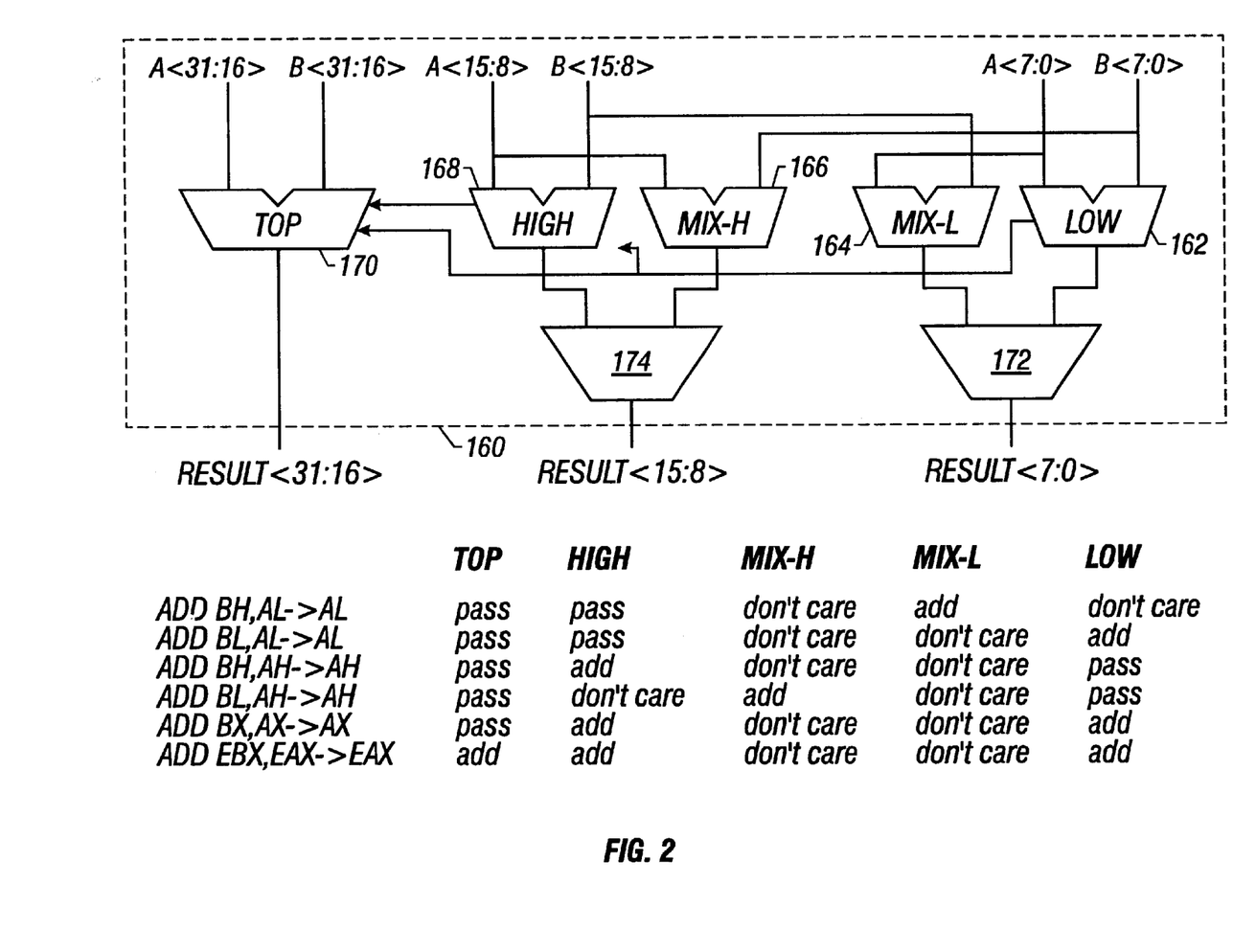
FIG. 2 shows a destination merging adder residing within a write handler according to the second embodiment of the present invention.

FIG. 2 shows a destination merging adder, residing within a write handler according to the second embodiment of the present invention. The destination merging adder of FIG. 2 includes an upper 16-bit adder 170, four smaller eight-bit adders 162–168, and two multiplexers 172 and 174. The smaller adders are used to generate the lower order portions of the results for the 16-bit and 32-bit adds. Collectively, the five adders 162–170 and two multiplexers, 172 and 174 may be regarded as a more sophisticated output multiplexer 160. The multiplexer 160 allows the ALU or other execution unit 102 to process partial register values as easily as full register values.

Although not shown in FIG. 2, the write handler of the second embodiment of the present invention also includes a switch for selecting a first register and a second register. The switch maps the first and second registers to inputs A and B of the destination merging adder, respectively. The switch also maps the second register to output RESULT of the destination merging adder.

The bottom of FIG. 2 shows a table including an itemization of the six add operations. The source register that is updated is shown as the second operand. When an addition is performed, no matter what the size or alignment, the entire 32 bits of each source register value are applied to the functional unit. More importantly, the entire 32 bits of the destination register value are provided from the functional unit. The table at the bottom of FIG. 2 lists what operation each of the five sub-units performs depending on the size and alignment of the operation.

When an 8-bit operation is performed on bits [7:0] of the operands, such as ADD BL, AL→AL, the addition is performed in adder 162. Adder 168 is commanded to pass bits [15:8] of the first source register, and not to add; alternately, bits [15:8] of the second source register are zeroed. Similarly, adder 170 is commanded to pass bits [31:16] of the first source register, and not to add; alternately, bits [31:16] of the second source register are zeroed. Multiplexer 172 is commanded to select adder 162, and multiplexer 174 is commanded to select adder 168. Adders 164 and 166 are ignored and not selected. Multiplexer 172 provides bits [7:0] of the RESULT register, multiplexer 174 provides bits [15:8] of the RESULT register, and adder 170 provides bits [31:16] of the RESULT register.

When an 8-bit operation is performed on bits [1 5:8] of the operands, such as ADD BH, AH→AH, the addition is performed in adder 168. Adder 162 is commanded to pass bits [7:0] of the first source register, and not to add; alternately, bits [7:0] of the second source register are zeroed. Similarly, adder 170 is commanded to pass bits [31:16] of the first source register, and not to add; alternately, bits [31:16] of the second source register are zeroed. Multiplexer 172 is commanded to select adder 162, and multiplexer 174 is commanded to select adder 168. Adders 164 and 166 are ignored and not selected. Multiplexer 172 provides bits [7:0] of the RESULT register, multiplexer 174 provides bits [15:8] of the RESULT register, and adder 170 provides bits [31:16] of the RESULT register.

However, some 8-bit operations are more complicated. When an 8-bit operation is performed on bits [15:8] of one of the operands and on bits [7:0] of the other of the operands, such as ADD BH, AL→AL, or ADD BL, AH→AH, the addition is performed by either MIX-L adder 164 or MIX-H adder 166, respectively.

When the instruction is ADD BH, AL→AL, then addition is performed in the MIX-L adder 164, and the sum is provided by multiplexer 172 to bits [7:0] of the RESULT register. Moreover, adder 168 and multiplexer 174 are commanded to pass bits [15:8] of the first source register, and adder 170 provides bits [31:16] of the first source operand to bits [31:16] of the RESULT register. Passing bits of one operand may be accomplished by zeroing corresponding bits of the second source operand. The MIX-H adder 166 is a don't-care, as it is not selected by multiplexer 174.

When the instruction is ADD BL, AH→AH, then addition is performed in the MIX-H adder 166, and the sum is provided by multiplexer 174 to bits [15:8] of the RESULT register. Moreover, adder 162 and multiplexer 172 are commanded to pass bits [7:0] of the first source register, and adder 170 provides bits [31:16] of the first source operand to bits [31:16] of the RESULT register. Passing bits of one operand may be accomplished by zeroing corresponding bits of the second source operand. The MIX-L adder 164 is a don't-care, as it is not selected by multiplexer 172.

When a 16-bit operation is performed on bits [15:0] of the operands, such as ADD BX, AX→AX, then addition is performed in two pieces. The lower order bits [7:0] are added in adder 162, and the higher order bits [15:8] are added in adder 168. Adder 162 is selected by multiplexer 172, and adder 168 is selected by multiplexer 174. Adders 164 and 166 are don't-care, as they are not selected by multiplexers 172 and 174. Adder 170 provides bits [31:16] of the first source operand to bits [31:1 6] of the RESULT register; alternately, bits [31:16] of the second source operand are zeroed.

When a 32-bit operation is performed on bits [15:0] of the operands, such as ADD EBX, FAX→EAX, then addition is performed in three pieces. The lower order bits [7:0] are added in adder 162; the higher order bits [15:8] are added in adder 168; and the extended order bits [31:16] are added in adder 170. Adder 162 is selected by multiplexer 172, and adder 168 is selected by multiplexer 174. Adders 164 and 166 are don't-care, as they are not selected by multiplexers 172 and 174.

In each case, an entire 32-bit result is generated, and there is no bypass complexity introduced. The 32-bit result is generated automatically in the case of ADD EBX, EAX→EAX; in the other cases, in which the operation itself does not produce a 32-bit result, additional bits are obtained to complete the 32-bit output. Advantageously, the additional bits are obtained from one of the inputs itself. The switch (not shown in FIG. 2) need only select two registers in a given order. One of the registers is updated, and the other is not; both registers are used as sources of operand values, and the updated source operand value itself provides the additional bits needed to complete the 32-bit output.

Note that an alternative implementation would select the data before performing the addition. Such an implementation is contemplated but not desired because it would delay producing generate and propagate terms for larger size additions. Instead, the multiplexer is placed after the add at the cost of an additional adder for each of the low and high bytes. These adders are only eight bits in size, which means they are very inexpensive.

Mixed-alignment byte adders need not generate carries to larger size adders because mixed-alignment only occurs with byte addition. Therefore, FIG. 2 depicts generate/propagate paths only from the fixed-alignment adders to upper adders.

Non-overwriting Instructions

As stated previously, most instructions in the x86 instruction set select and operate on two (source) operands, and then write the result back to one of the two source operands rather than to a third operand. In the case of ADD, all of the x86 instruction set ADD operations fall into six categories, all of which overwrite at least part of one of the source registers. However, for some other operations, a third register must be considered when neither of the source registers is updated as a result of the instruction.

In the second embodiment, where the destination register is not one of the source registers, three registers must be identified, and the non-updated portion of the result is not readily available, as is the case with x86 ADDs. In other words, some bits of the first operand and some bits of the second operand must be obtained to perform the operation, but also some bits of the destination register must be obtained to provide the additional bits needed to obtain a 32-bit result. The bits of the destination register require additional paths, to enable the partial write handler to read the destination register to obtain this information. This typically requires an additional read port and all its associated bypass hardware. Nevertheless, adding an output multiplexer generally reduces the extent of the complex datapath hardware that would be required if all three operands were provided in the datapath. Providing the two source operands to the datapath and the third destination operand to the output multiplexer, as in the second embodiment, therefore reduces the amount of the interconnect hardware. While expensive, the savings in control complexity and/or additional datapath hardware are in most cases worthwhile.

In cases where it is determined to be too expensive to add destination access resources, limitations to pipelining or superscalarity can be imposed. That is, if an infrequent operation is encountered which does require seeing the entire result, the instruction can be dispatched alone and other instruction register file/ bypass resources can be used to obtain the destination.

The present invention includes a partial register write handler. The write handler receives either two or three operands. An execution unit 102 optionally operates on portions of two operands, rather than on full operands. The result of the execution unit 102 has fewer bits than an "additional" operand, which may be any of the two or three operands received by the write handler. An output multiplexer receives all of the bits of an execution unit 102 result and selected bits of the additional operand, and produces an output that has as many bits as the additional operand. If the output of the multiplexer is a string of bits, the string of bits contains the execution unit 102 result as a substring of bits. The remaining bits of the output of the multiplexer are selected from the additional operand.

Other embodiments of the invention will be apparent to those skilled in the art after considering this specification or practicing the disclosed invention. The specification and examples above are exemplary only, with the true scope of the invention being indicated by the following claims.

We claim the following invention:

1. A system having an execution unit for performing instructions upon data, the execution unit configured to read operand data from registers and to provide result data to registers, the system comprising:

a register file comprising a first plurality of registers including a first register having a first number of bits, a second register having a second number of bits, and a third register having a third number of bits;

a pending file comprising a second plurality of registers, the pending file comprising at least one register corresponding to the first register, at least one register corresponding to the second register, and at least one register corresponding to the third register;

a bypass multiplexer configured to select a first operand either from the first register or from one of the at least one register corresponding to the first register in the pending file, and further configured to select a second operand either from the second register or from one of the at least one register corresponding to the second register in the pending file;

an execution unit, configured to perform an operation upon a portion of the first operand and upon a portion of the second operand, the execution unit further configured to provide a result having a number of bits no greater than the number of bits of the third register; and an output multiplexer configured to receive all of the bits of the execution unit result, the output multiplexer further configured to select a third operand either from the third register or from one of the at least one register corresponding to the third register in the pending file, the output multiplexer further configured to select a portion of the third operand having a number of bits equal to the difference between the number of bits in the third register and the number of bits in the execution unit result, the output multiplexer further configured to provide an output multiplexer output comprising the selected portion of the third operand and the execution unit result, the multiplexer output configured to provide the output multiplexer output to one register in a group comprising of the third register and the at least one register corresponding to the third register in the pending file.

2. The system of claim 1, further comprising:

a first selector for selecting a portion of the first operand;

a second selector for selecting a portion of the second operand;

a third selector for selecting a portion of the third operand;

the execution unit, for performing an operation upon the selected portion of the first operand and the selected portion of the second operand, the execution unit further providing a result; and the output multiplexer configured to receive all of the bits of the execution unit result and all of the bits of the selected portion of the third operand, the output multiplexer configured to provide the output multiplexer output comprising the selected portion of the third operand and the execution unit result, the output multiplexer output replacing the third operand.

3. The system of claim 2, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between m and p, where 0<=m<=p<=n−1;

the selected portion of the second operand includes the bits of the second operand that are numbered between m and p; and the selected portion of the third operand includes all of the bits of the third operand, except the bits that are numbered between m and p.

4. The system of claim 3, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between 0 and 7;

the selected portion of the second operand includes the bits of the second operand that are numbered between 0 and 7; and the selected portion of the third operand includes all of the bits of the third operand, except the bits that are numbered between 0 and 7.

5. The system of claim 4, wherein:

the execution unit is configured to add the bits of the first operand that are numbered between 0 and 7, to the bits of the second operand that are numbered between 0 and 7, the execution unit further being configured to provide a sum as the result;

the selected portion of the third operand includes bits 8 to 31 of the third operand; and the output multiplexer is configured to provide the sum as bits 0 to 7 of the output multiplexer output, the output multiplexer further being configured to provide bits 8 to 31 of the third operand as bits 8 to 31 of the output multiplexer output.

6. The system of claim 2, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between m and p, where 0<=m<=p<=n−2;

the selected portion of the second operand includes the bits of the second operand that are numbered between p and q, where p<q<=n−1; and the selected portion of the third operand includes all of the bits of the third operand, except the bits that are numbered between m and q.

7. The system of claim 6, wherein:

the first and second operands have 32 bits;

the bits of the first operand have bit positions numbered from 0 to 31;

the bits of the second operand have bit positions numbered from 0 to 31; the selected portion of the first operand includes the bits of the first operand that are numbered between 0 and 7;

the selected portion of the second operand includes the bits of the second operand that are numbered between 8 and 15; and the selected portion of the third operand includes bits 16 to 31 of the third operand.

8. The system of claim 7, wherein:

the execution unit is configured to add the bits of the first operand that are numbered between 0 and 7, to the bits of the second operand that are numbered between 8 and 15, the execution unit further being configured to provide a sum as the result;

the selected portion of the third operand includes bits 0 to 7, and bits 16 to 31, of the third operand; and the output multiplexer is configured to provide the sum as bits 8 to 15 of the output multiplexer output, the output multiplexer further being configured to provide bits 0 to 7 of the third operand as bits 0 to 7 of the output multiplexer output, and the output multiplexer further being configured to provide bits 16 to 31 of the third operand as bits 16 to 31 of the output multiplexer output.

9. The system of claim 1, wherein:

the execution unit is an arithmetic logic unit configured to perform an ADD operation upon a selected portion of the first operand and a selected portion of the second operand, the execution unit further providing a sum of the selected portion of the first operand and the selected portion of the second operand.

10. An apparatus for handling partial register access, the apparatus configured to receive a result operand from an execution unit and to access a plurality of registers, the execution unit configured to perform an operation upon a portion of a first operand and upon a portion of a second operand, the execution unit further providing a result as a destination operand, comprising:

a register file comprising a first plurality of registers including a first register having a first number of bits, a second register having a second number of bits, and a third register having a third number of bits;

a pending file comprising a second plurality of registers, the pending file comprising at least one register corresponding to the first register, at least one register corresponding to the second register, and at least one register corresponding to the third register;

a bypass multiplexer configured to select a first operand either from the first register or from one of the at least one register corresponding to the first register in the pending file, and further configured to select a second operand either from the second register or from one of the at least one register corresponding to the second register in the pending file;

an execution unit, configured to perform an operation upon a portion of the first operand and upon a portion of the second operand, the execution unit further configured to provide a result having a number of bits no greater than the number of bits of the third register; and an output multiplexer configured to receive all of the bits of the execution unit result, the output multiplexer further configured to select a third operand either from the third register or from one of the at least one register corresponding to the third register in the pending file, the output multiplexer further configured to select a portion of the third operand having a number of bits equal to the difference between the number of bits in the third register and the number of bits in the execution unit result, the output multiplexer further configured to provide an output multiplexer output comprising the selected portion of the third operand and the execution unit result, the output multiplexer output configured to provide the output multiplexer output to one register in a group comprising of the third register and the at least one register corresponding to the third register in the pending file.

11. The apparatus of claim 10, further comprising:

a first selector for selecting a portion of the first operand;

a second selector for selecting a portion of the second operand;

a third selector for selecting a portion of the third operand;

the execution unit, for performing an operation upon the selected portion of the first operand and the selected portion of the second operand, the execution unit further providing a result; and the output multiplexer configured to receive all of the bits of the execution unit result and all of the bits of the selected portion of the third operand, the output multiplexer configured to provide the output multiplexer output comprising the selected portion of the third operand and the execution unit result, the output multiplexer output replacing the third operand.

12. The apparatus of claim 11, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between m and p, where 0<=m<=p<=n−1;

the selected portion of the second operand includes the bits of the second operand that are numbered between m and p; and the selected portion of the third operand includes all of the bits of the third operand, except the bits that are numbered between m and p.

13. The system of claim 12, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between 0 and 7;

the selected portion of the second operand includes the bits of the second operand that are numbered between 0 and 7; and the selected portion of the third operand includes all of the bits of the third operand, except the bits that are numbered between 0 and 7.

14. The system of claim 13, wherein:

the execution unit is configured to add the bits of the first operand that are numbered between 0 and 7, to the bits of the second operand that are numbered between 0 and 7, the execution unit further being configured to provide a sum as the result;

the selected portion of the third operand includes bits 8 to 31 of the third operand; and the output multiplexer is configured to provide the sum as bits 0 to 7 of the output multiplexer output, the output multiplexer further being configured to provide bits 8 to 31 of the third operand as bits 8 to 31 of the output multiplexer output.

15. The system of claim 11, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between m and p, where 0<=m<=p<=n−2;

the selected portion of the second operand includes the bits of the second operand that are numbered between p and q, where p<q<=n−1; and the selected portion of the third operand includes all of the bits of the third operand, except the bits that are numbered between m and q.

16. The system of claim 15, wherein:

the first and second operands have 32 bits;

the bits of the first operand have bit positions numbered from 0 to 31;

the bits of the second operand have bit positions numbered from 0 to 31;

the selected portion of the first operand includes the bits of the first operand that are numbered between 0 and 7;

the selected portion of the second operand includes the bits of the second operand that are numbered between 8 and 15; and the selected portion of the third operand includes bits 16 to 31 of the third operand.

17. The system of claim 16, wherein:

the execution unit is configured to add the bits of the first operand that are numbered between 0 and 7, to the bits of the second operand that are numbered between 8 and 15, the execution unit further being configured to provide a sum as the result;

the selected portion of the third operand includes bits 0 to 7, and bits 16 to 31, of the third operand; and the output multiplexer is configured to provide the sum as bits 8 to 15 of the output multiplexer output, the output multiplexer further being configured to provide bits 0 to 7 of the third operand as bits 0 to 7 of the output multiplexer output, and the output multiplexer further being configured to provide bits 16 to 31 of the third operand as bits 16 to 31 of the output multiplexer output.

18. The system of claim 10, wherein:

the execution unit is an arithmetic logic unit configured to perform an ADD operation upon a selected portion of the first operand and a selected portion of the second operand, the execution unit further providing a sum of the selected portion of the first operand and the selected portion of the second operand.

19. A method to manufacture an apparatus for handling partial register access, the apparatus configured to receive a result operand from an execution unit and to access a plurality of registers, the execution unit configured to perform an operation upon a portion of a first operand and upon a portion of a second operand, the execution unit further providing a result as a destination operand, comprising:

providing a register file comprising a first plurality of registers including a first register having a first number of bits, a second register having a second number of bits, and a third register having a third number of bits;

providing a pending file comprising a second plurality of registers, the pending file comprising at least one register corresponding to the first register, at least one register corresponding to the second register, and at least one register corresponding to the third register;

providing a bypass multiplexer configured to select a first operand either from the first register or from one of the at least one register corresponding to the first register in the pending file, and further configured to select a second operand either from the second register or from one of the at least one register corresponding to the second register in the pending file;

providing an execution unit, configured to perform an operation upon a portion of the first operand and upon a portion of the second operand, the execution unit further configured to provide a result having a number of bits no greater than the number of bits of the third register; and providing an output multiplexer configured to receive all of the bits of the execution unit result, the output multiplexer further configured to select a third operand either from the third register or from one of the at least one register corresponding to the third register in the pending file, the output multiplexer further configured to select a portion of the third operand having a number of bits equal to the difference between the number of bits in the third register and the number of bits in the execution unit result, the output multiplexer further configured to provide an output multiplexer output comprising the selected portion of the third operand and the execution unit result, the output multiplexer output configured to provide the output multiplexer output to one register in a group comprising of the third register and the at least one register corresponding to the third register in the pending file.

20. The method of claim 19, further comprising:

providing a first selector for selecting a portion of the first operand;

providing a second selector for selecting a portion of the second operand;

providing a third selector for selecting a portion of the third operand;

the execution unit, for performing an operation upon the selected portion of the first operand and the selected portion of the second operand, the execution unit further providing a result; and the output multiplexer configured to receive all of the bits of the execution unit result and all of the bits of the selected portion of the third operand, the output multiplexer configured to provide the output multiplexer output comprising the selected portion of the third operand and the execution unit result, the output multiplexer output replacing the third operand.

21. The method of claim 20, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between m and p, where $0<=m<=p<=n-1$;

the selected portion of the second operand includes the bits of the second operand that are numbered between m and p; and the selected portion of the third operand includes all of the bits of the third operand, except the bits that are numbered between m and p.

22. The method of claim 21, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between 0 and 7;

the selected portion of the second operand includes the bits of the second operand that are numbered between 0 and 7; and the selected portion of the third operand includes all of the bits of the third operand, except the bits that are numbered between 0 and 7.

23. The method of claim 22, wherein:

the execution unit is configured to add the bits of the first operand that are numbered between 0 and 7, to the bits of the second operand that are numbered between 0 and 7, the execution unit further being configured to provide a sum as the result;

the selected portion of the third operand includes bits 8 to 31 of the third operand; and the output multiplexer is configured to provide the sum as bits 0 to 7 of the output multiplexer output, the output multiplexer further being configured to provide bits 8 to 31 of the third operand as bits 8 to 31 of the output multiplexer output.

24. The method of claim 20, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between m and p, where $0<=m<=p<=n-2$;

the selected portion of the second operand includes the bits of the second operand that are numbered between p and q, where $p<q<=n-1$; and the selected portion of the third operand includes all of the bits of the third operand, except the bits that are numbered between m and q.

25. The method of claim 24, wherein:

the first and second operands have 32 bits;

the bits of the first operand have bit positions numbered from 0 to 31;

the bits of the second operand have bit positions numbered from 0 to 31;

the selected portion of the first operand includes the bits of the first operand that are numbered between 0 and 7;

the selected portion of the second operand includes the bits of the second operand that are numbered between 8 and 15; and the selected portion of the third operand includes bits 16 to 31 of the third operand.

26. The method of claim 25, wherein:

the execution unit is configured to add the bits of the first operand that are numbered between 0 and 7, to the bits of the second operand that are numbered between 8 and 15, the execution unit further being configured to provide a sum as the result;

the selected portion of the third operand includes bits 0 to 7, and bits 16 to 31, of the third operand; and the output multiplexer is configured to provide the sum as bits 8 to 15 of the output multiplexer output, the output multiplexer further being configured to provide bits 0 to 7 of the third operand as bits 0 to 7 of the output multiplexer output, and the output multiplexer further being configured to provide bits 16 to 31 of the third operand as bits 16 to 31 of the output multiplexer output.

27. The method of claim 19, wherein:

the execution unit is an arithmetic logic unit configured to perform an ADD operation upon a selected portion of the first operand and a selected portion of the second operand, the execution unit further providing a sum of the selected portion of the first operand and the selected portion of the second operand.

28. A method to use an apparatus for handling partial register access, the apparatus configured to receive a result operand from an execution unit and to access a plurality of registers, the execution unit configured to perform an operation upon a portion of a first operand and upon a portion of a second operand, the execution unit further providing a result as a destination operand, comprising:

providing a register file comprising a first plurality of registers including a first register having a first number of bits, a second register having a second number of bits, and a third register having a third number of bits;

providing a pending file comprising a second plurality of registers, the pending file comprising at least one register corresponding to the first register, at least one register corresponding to the second register, and at least one register corresponding to the third register;

configuring a bypass multiplexer to select a first operand either from the first register or from one of the at least one register corresponding to the first register in the pending file, and further configured to select a second operand either from the second register or from one of the at least one register corresponding to the second register in the pending file;

configuring an execution unit to perform an operation upon a portion of the first operand and upon a portion of the second operand, the execution unit further configured to provide a result having a number of bits no greater than the number of bits of the third register; and configuring an output multiplexer to receive all of the bits of the execution unit result, the output multiplexer further configured to select a third operand either from the third register or from one of the at least one register corresponding to the third register in the pending file, the output multiplexer further configured to select a portion of the third operand having a number of bits equal to the difference between the number of bits in the third register and the number of bits in the execution unit result, the output multiplexer further configured to provide an output multiplexer output comprising the selected portion of the third operand and the execution unit result, the output multiplexer output configured to provide the output multiplexer output to one register in a group comprising of the third register and the at least one register corresponding to the third register in the pending file.

29. The method of claim 28, further comprising:

providing a first selector for selecting a portion of the first operand;

providing a second selector for selecting a portion of the second operand;

providing a third selector for selecting a portion of the third operand;

the execution unit, for performing an operation upon the selected portion of the first operand and the selected portion of the second operand, the execution unit further providing a result; and the output multiplexer configured to receive all of the bits of the execution unit result and all of the bits of the selected portion of the third operand, the output multiplexer configured to provide the output multiplexer output comprising the selected portion of the third operand and the execution unit result, the output multiplexer output replacing the third operand.

30. The method of claim 29, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between m and p, where 0<=m<=p<=n−1;

the selected portion of the second operand includes the bits of the second operand that are numbered between m and p; and the selected portion of the third operand includes all of the bits of the third operand, except the bits that are numbered between m and p.

31. The method of claim 30, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between 0 and 7;

the selected portion of the second operand includes the bits of the second operand that are numbered between 0 and 7; and the selected portion of the third operand includes all of the bits of the third operand, except the bits that are numbered between 0 and 7.

32. The method of claim 31, wherein:

the execution unit is configured to add the bits of the first operand that are numbered between 0 and 7, to the bits of the second operand that are numbered between 0 and 7, the execution unit further being configured to provide a sum as the result;

the selected portion of the third operand includes bits 8 to 31 of the third operand; and the output multiplexer is configured to provide the sum as bits 0 to 7 of the output multiplexer output, the output multiplexer further being configured to provide bits 8 to 31 of the third operand as bits 8 to 31 of the output multiplexer output.

33. The method of claim 29, wherein:

the first and second operands have equal numbers of bits;

the bits of the first operand have bit positions numbered from 0 to n−1;

the bits of the second operand have bit positions numbered from 0 to n−1;

the selected portion of the first operand includes the bits of the first operand that are numbered between m and p, where 0<=m<=p<=n−2;

the selected portion of the second operand includes the bits of the second operand that are numbered between p and q, where p<q<=n−1; and the selected portion of the third operand includes all of the bits of the third operand, except the bits that are numbered between m and q.

34. The method of claim 33, wherein:

the first and second operands have 32 bits;

the bits of the first operand have bit positions numbered from 0 to 31;

the bits of the second operand have bit positions numbered from 0 to 31;

the selected portion of the first operand includes the bits of the first operand that are numbered between 0 and 7;

the selected portion of the second operand includes the bits of the second operand that are numbered between 8 and 15; and the selected portion of the third operand includes bits 16 to 31 of the third operand.

35. The method of claim 34, wherein:

the execution unit is configured to add the bits of the first operand that are numbered between 0 and 7, to the bits of the second operand that are numbered between 8 and 15, the execution unit further being configured to provide a sum as the result;

the selected portion of the third operand includes bits 0 to 7, and bits 16 to 31, of the third operand; and the output multiplexer is configured to provide the sum as bits 8 to 15 of the output multiplexer output, the output multiplexer further being configured to provide bits 0 to 7 of the third operand as bits 0 to 7 of the output multiplexer output, and the output multiplexer further being configured to provide bits 16 to 31 of the third operand as bits 16 to 31 of the output multiplexer output.

36. The method of claim 28, wherein:

the execution unit is an arithmetic logic unit configured to perform an ADD operation upon a selected portion of the first operand and a selected portion of the second operand, the execution unit further providing a sum of the selected portion of the first operand and the selected portion of the second operand.

* * * * *